United States Patent
Kumagai et al.

(10) Patent No.: US 8,774,001 B2
(45) Date of Patent: Jul. 8, 2014

(54) RELAY DEVICE AND RELAY METHOD

(75) Inventors: Takeshi Kumagai, Atsugi (JP);
Nobuhito Matsuyama, Hadano (JP);
Takeshi Aimoto, Kawasaki (JP); Toshio Doi, Kodaira (JP); Kazuo Sugai, Hadano (JP)

(73) Assignee: Alaxala Networks Corporation, Kawasaki (JP)

( * ) Notice: Subject to any disclaimer, the term of this patent is extended or adjusted under 35 U.S.C. 154(b) by 67 days.

(21) Appl. No.: 13/357,927

(22) Filed: Jan. 25, 2012

(65) Prior Publication Data
US 2012/0188874 A1     Jul. 26, 2012

(30) Foreign Application Priority Data

Jan. 26, 2011  (JP) ................................ 2011-013547
Jun. 27, 2011  (JP) ................................ 2011-141383
Nov. 2, 2011   (JP) ................................ 2011-240766

(51) Int. Cl.
*H04L 12/26* (2006.01)

(52) U.S. Cl.
USPC ........................... 370/235; 370/229; 370/412

(58) Field of Classification Search
USPC ................................ 370/235, 242
See application file for complete search history.

(56) References Cited

U.S. PATENT DOCUMENTS

| 6,473,432 | B1 * | 10/2002 | Nishimura et al. | 370/412 |
| 7,136,356 | B2 * | 11/2006 | Suzuki et al. | 370/235 |
| 2002/0181484 | A1 * | 12/2002 | Aimoto | 370/413 |
| 2007/0230435 | A1 * | 10/2007 | Anzai | 370/351 |
| 2009/0141732 | A1 * | 6/2009 | Woo et al. | 370/412 |

FOREIGN PATENT DOCUMENTS

| JP | 11-346246 | 12/1999 |
| JP | 3766259 | 2/2006 |
| JP | 2007-082127 | 3/2007 |

* cited by examiner

*Primary Examiner* — Yemane Mesfin
*Assistant Examiner* — Jeff Banthrongsack
(74) *Attorney, Agent, or Firm* — Foley & Lardner LLP

(57) ABSTRACT

A relay device of relaying a communication packet is disclosed, which comprises: an input module configured to receive the communication packet as an input; a buffer configured to have a plurality of queues and temporarily accumulated the received communication packet; a sorter configured to sort the received communication packet to one of the plurality of queues, depending on a specific value obtained by a predetermined function that gives an aggregate output from an input which is transfer information regarding transfer of the communication packet; and a band controller configured to control a bandwidth for each of the plurality of queues and output communication packets accumulated in the plurality of queues for transmission of the communication packets. This ensures the quality of service, while saving the capacity of the buffer used for the queues.

14 Claims, 5 Drawing Sheets

RELAY DEVICE AND RELAY METHOD

CROSS REFERENCE TO RELATED APPLICATIONS

This application claims the priority based on Japanese Patent Application No. 2011-13547 filed on Jan. 26, 2011, Japanese Patent Application No. 2011-141383 filed on Jun. 27, 2011 and Japanese Patent Application No. 2011-240766 filed on Nov. 2, 2011, the disclosures of which are hereby incorporated by reference in their entireties.

BACKGROUND

1. Technical Field

The present invention relates to relay technique of communication packets and more specifically to transmission bandwidth control.

2. Description of the Related Art

Recently, streaming technology for real-time delivery of electronic contents, such as video or sound, via a network has become popular. Such streaming via the Internet enables a large number of users to share an identical line, so as to save the cost per bandwidth. There is a requirement for reducing the amount of discarded communication packets and ensuring the quality of service (QoS). One proposed technique provides a relay device with a shaper to smoothen and transfer a large amount of simultaneously transmitted data at a fixed rate (for example, JP H11-346246).

The proposed technique of JP H11-346246 sets a flow condition corresponding to each user or each service as structure definition information, temporarily accumulates each received communication packet into one of queues provided for individual flows, and transfers the communication packet based on a preset shaping condition (e.g., delivery bandwidth or priority). This technique can ensure the preset quality of service for each user or for each service.

The proposed technique of JP H11-346246, however, needs to set a flow for each user or for each service and accordingly has difficulty in dealing with a large number of users or a large number of services. For example, when flows are to be set for several million users, it is practically hard to provide an identical number of several million queues corresponding to the number of the several million users. Even when it is possible to provide several million queues, this requires a storage medium of an enormous storage capacity and has extremely heavy load on sorting received communication packets, thus leading to an unpractical, remarkable cost increase. It is also inefficient to provide queues for all the users including the users of very low activities.

Consequently, in order to address the problem described above, there is a need to provide relay technique that ensures the quality of service, while saving the capacity of a buffer used for queues.

SUMMARY

In order to achieve at least part of the foregoing, the present invention provides various aspects and embodiments described below. According to a first aspect of the invention, there is provided a relay device of relaying a communication packet, which comprises: an input module configured to receive the communication packet as an input; a buffer configured to have a plurality of queues and temporarily accumulated the received communication packet; a sorter configured to sort the received communication packet to one of the plurality of queues, depending on a specific value obtained by a predetermined function that gives an aggregate output from an input which is transfer information regarding transfer of the communication packet; and a band controller configured to control a bandwidth for each of the plurality of queues and output communication packets accumulated in the plurality of queues for transmission of the communication packets. The relay device according to the first aspect distributes the received communication packets into the plurality of queues, based on the transfer information. This allows for isolation of the effect of discarding communication packets with respect to each of the plurality of queues at the time of congestion. This effectively prevents the congestion from affecting the entire traffic and thereby ensures the quality of service. There is no requirement for providing a queue for each flow, so that the capacity of the buffer used for queues can be saved.

According to a second aspect of the invention, there is provided the relay device according to the first aspect, wherein the transfer information may comprise destination information that is included in header information of the received communication packet and is specified by a destination of the communication packet. The relay device according to the second aspect distributes the received communication packets into the plurality of queues, based on the destination information. This allows for isolation of the effect of discarding communication packets with respect to each of the plurality of queues at the time of congestion. When congestion occurs due to a specific destination, this effectively prevents the congestion from affecting the entire traffic.

According to a third aspect of the invention, there is provided the relay device according to the first aspect, wherein the input module may have a plurality of physical input ports, and the transfer information may comprise port information capable of identifying a physical input port that has received the communication packet, among the plurality of physical input ports. The relay device according to the third aspect distributes the received communication packets into the plurality of queues, based on the port information. This allows for isolation of the effect of discarding communication packets with respect to each of the plurality of queues at the time of congestion. When congestion occurs due to a specific source, this effectively prevents the congestion from affecting the entire traffic.

According to a fourth aspect of the invention, there is provided the relay device according to the first aspect, wherein the input module may have a plurality of physical input ports, and the sorter may sort the communication packet according to both a first value obtained by a first function as the predetermined function using destination information that is included in header information of the received communication packet and is determined according to a destination of the communication packet, as the transfer information, and a second value obtained by a second function as the predetermined function using port information that identifies an physical input port that has received the communication packet among the plurality of physical input ports, as the transfer information. The relay device according to the fourth aspect distributes the received communication packets into the plurality of queues, based on both the destination information and the port information. This allows for isolation of the effect of discarding communication packets with respect to each of the plurality of queues at the time of congestion. When congestion occurs due to a specific destination and/or a specific source, this effectively prevents the congestion from affecting the entire traffic.

According to a fifth aspect of the invention, there is provided the relay device according to the fourth aspect, wherein the plurality of queues may be classified in multiple hierarchies, and the sorter may perform a first process of sorting the communication packet to one of plural queues in one hierarchy of the multiple hierarchies according to the first value and a second process of sorting the communication packet to one of plural queues in another hierarchy of the multiple hierarchies according to the second value, in a stepwise manner. The relay device according to the fifth aspect has the plurality of queues classified in multiple hierarchies and performs the sorting of communication packets according to the first value and the sorting of communication packets according to the second value in a stepwise manner. This simplifies the respective sorting processes.

According to a sixth aspect of the invention, there is provided the relay device according to any of the first to the fifth aspects, which may further comprise: a discard detector configured to detect an amount of discarded communication packets with respect to each of the queues at congestion in any of the plurality of queues; and a first function selector configured to change the predetermined function to another function provided in advance, when any of the amounts of discarded communication packets detected with respect to each of the queues reaches or exceeds a preset level. When the amount of discarded communication packets at the time of congestion reaches or exceeds the preset level in any of the plurality of queues, the relay device according to the sixth aspect changes the predetermined function to be used for the sorting of communication packets. This can eliminate unevenness in distribution of communication packets according to the predetermined function, if there is any.

According to a seventh aspect of the invention, there is provided a relay device of relaying a communication packet, which comprises: an input module configured to have a plurality of physical input ports and receive the communication packet as an input; a buffer configured to have a plurality of queues and temporarily accumulated the received communication packet; a sorter configured to sort the received communication packet to one of the plurality of queues, depending on a physical input port that has received the communication packet among the plurality of physical input ports; and a band controller configured to control a bandwidth for each of the plurality of queues and output communication packets accumulated in the plurality of queues for transmission of the communication packets. The relay device according to the seventh aspect sorts and stores a received communication packet into one of the plurality of queues, depending on the physical input port that has received the communication packet, controls the bandwidth for each of the queues, and outputs the communication packets accumulated in the plurality of queues for transmission of the communication packets. The received communication packet is sorted to one of the plurality of queues, based on the physical input port that has received the communication packet. When congestion occurs due to a specific source, this effectively prevents the congestion from affecting the entire traffic. There is no requirement for providing a queue for each flow, so that the capacity of the buffer used for queues can be saved.

The present invention is not limited to the relay device, but may also be actualized by diversity of other applications, for example, a relay method according to an eighth aspect of the invention described below, a relay program, and a storage medium in which the relay program is recorded. According to an eighth aspect of the invention, there is provided a relay method of relaying a communication packet in a relay device having a plurality of queues. The relay method receives a communication packet. The relay method sorts the received communication packet to one of the plurality of queues according to a specific value obtained by a predetermined function that gives an aggregate output from an input, which is transfer information regarding transfer of the communication packet, and stores received communication packets to the plurality of queues in a distributive manner. The relay method controls a bandwidth for each of the plurality of queues and sends communication packets accumulated in the plurality of queues.

According to a ninth aspect of the invention, there is provided the relay device according to the first aspect, which may further comprise: a congestion detector configured to detect a degree of congestion with regard to each of the plurality of queues; and an importance analyzer configured to analyze a degree of importance based on header information of the communication packet. When it is determined that any of the degree of congestions detected with respect to the plurality of queues is not less than a preset level, the sorter may transfer to the importance analyzer a communication packet which is to be sorted to a queue determined to have the degree of congestion that is not less than the preset level. The importance analyzer may analyze the degree of importance of the communication packet transferred from the sorter, determine discard priority of the communication packet based on the analyzed degree of importance, add the determined discard priority to the communication packet and transfer the communication packet with the discard priority to the sorter. The sorter may sort the communication packet with the discard priority to one of the plurality of queues. The buffer may refer to the discard priority added to the communication packet sorted by the sorter and determine whether the communication packet is to be stored in the queue, based on the discard priority and a threshold value determined corresponding to the discard priority. The relay device according to the ninth aspect has the importance analyzer and adds the discard priority determined according to the degree of importance of a communication packet, which is to be sorted to a queue detected as congestion. The communication packet with the higher degree of importance is set to have the lower discard priority, while the communication packet with the lower degree of importance is set to have the higher discard priority. This sets the lower discard probability in the buffer for the communication packet with the higher degree of importance. The importance analyzer processes only the communication packets that are to be sorted to the queues detected as congestion. The importance analyzer is thus not required to have the throughput for processing all communication packets. This saves the device cost.

According to a tenth aspect of the invention, there is provided the relay device according to the first aspect, which may further comprise: a congestion detector configured to detect a degree of congestion with regard to each of the plurality of queues; and a second function selector configured to change the predetermined function to another function provided in advance, when any of the degrees of congestions detected with regard to the plurality of queues is not less than a preset level. When the degree of congestion reaches or exceeds the preset level in any of the plurality of queues, the relay device according to the tenth aspect changes the predetermined function to be used for the sorting of communication packets. This can eliminate unevenness in distribution of communication packets according to the predetermined function, if there is any.

According to an eleventh aspect of the invention, there is provided the relay device according to the first aspect, which may further comprise: a priority analyzer configured to determine a transfer priority of the communication packet received by the input module, based on a value included in header information of the received packet; and a queue definer configured to define a limited range of queues, to which a communication packet is to be sorted, with respect to each transfer priority. According to a twelfth aspect of the invention, there is provided the relay device according to the eleventh aspect, wherein the priority analyzer may determine the transfer priority, based on the header information of the communication packet, and the sorter may sort the communication packet to the limited range of queues defined by the queue definer, based on the determined transfer priority. In the relay device according to the eleventh aspect or the twelfth aspect, the priority analyzer determines the transfer priority of a communication packet, and the queue definer defines the limited range of queues, to which a communication packet is to be sorted, with respect to each transfer priority. This can preferentially send the communication packet with the higher transfer priority with little delay, while saving the capacity of the buffer used for queues with regard to each transfer priority.

DESCRIPTION OF THE EMBODIMENTS

A. First Embodiment

Embodiments of the invention are described, by way of example only, with reference to the accompanying drawings.

A-1. Network Configuration

Figure 1:
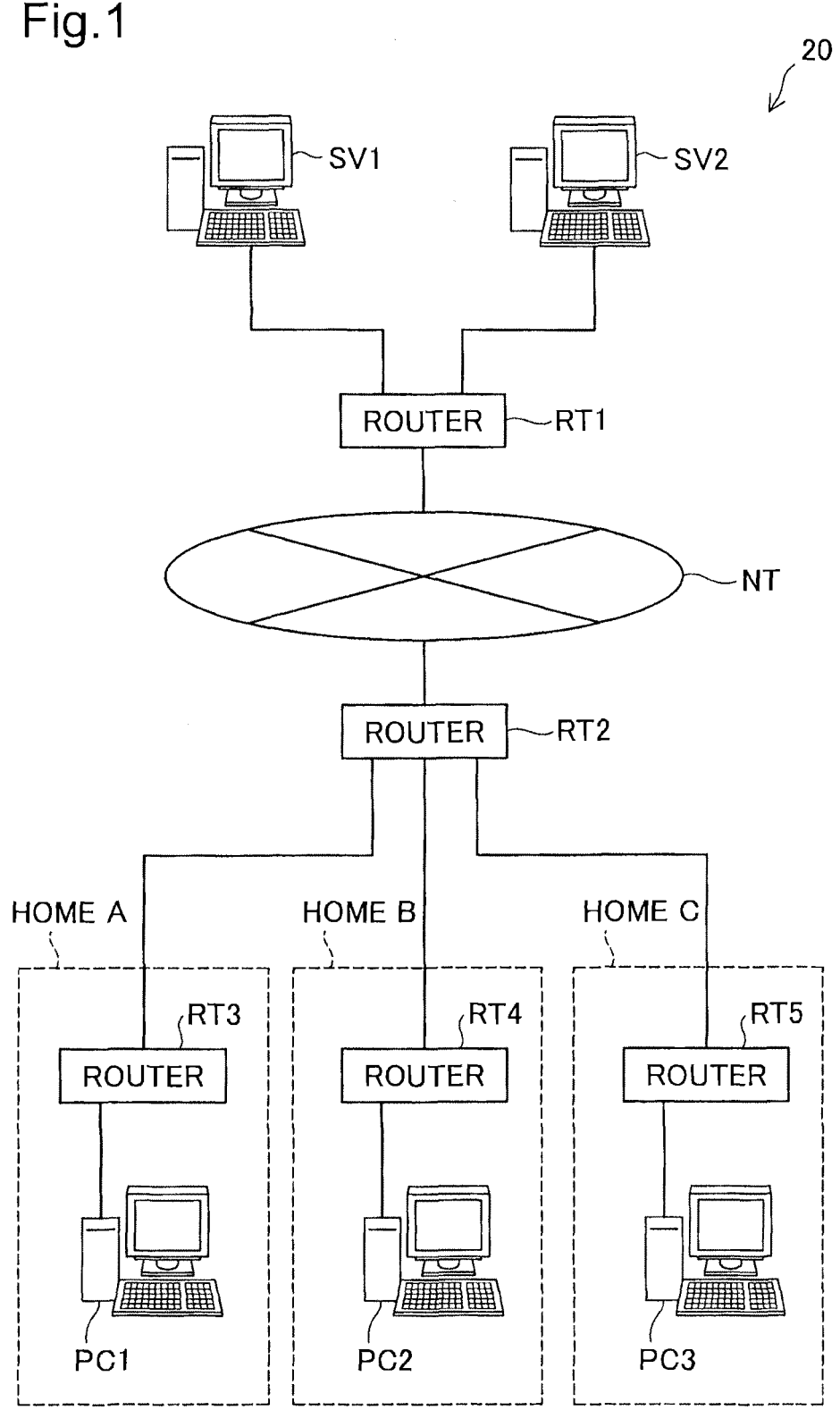
FIG. 1 illustrates an exemplary network configuration including routers RT1 and RT2 according to one embodiment of the relay device of the invention.

An exemplary network configuration including routers RT1 and RT2 according to one embodiment of the relay device of the invention is shown in FIG. 1 as a communication system 20. The communication system 20 is constructed as a network system providing the user with contents, such as videos, by streaming. As illustrated, the communication system 20 includes servers SV1 and SV2, routers RT1 to RT5 and personal computers PC1 to PC3.

The servers SV1 and SV2 store various contents and provide the user with the stored contents. These servers SV1 and SV2 are directly connected to the router RT1. For the convenience of description, the number of servers connected to the router RT1 is two according to the illustrated embodiment. But this number is not restrictive, and three or more servers may be connected to the router RT1.

The router RT1 is connected to a network NT. The network NT is the Internet according to this embodiment. The network NT is, however, not limited to the Internet but may be any other type of network, e.g., WAN (Wide Area Network) of leased circuit or LAN (Local Area Network).

The router RT2 is also connected to the network NT. According to this embodiment, the servers SV1 and SV2 and the routers RT1 and RT2 are installed by an ISP (Internet Service Provider) providing content delivery services. The router RT2 is connected with personal computers PC1 to PC3 via routers RT3 to RT5 located in respective homes A to C. Another relay device or a hub may be located between the router RT2 and any of the routers RT3 to RT5.

The personal computers PC1 to PC3 are general-purpose personal computers. Terminals connected to the routers RT3 to RT5 are not limited to the personal computers but may be any other devices that can utilize the contents delivered by the servers SV1 and SV2, for example, network-compatible television sets. A plurality of terminals may be connected to each of the routers RT3 to RT5. For the convenience of description, the router RT2 is connected to home networks A to C according to the illustrated embodiment. In the actual state, however, the router RT2 may be connected to, for example, several thousands of or several tens of thousands of home networks.

In this communication system 20, in response to a use request of a specified content from one of the personal computers PC1 to PC3, the server SV1 or SV2 delivers the specified content to the personal computer PC1, PC2 or PC3 sending the use request. Each of the routers RT1 and RT2 receives communication packets delivered by the servers SV1 and SV2, temporarily accumulates the received communication packets in a buffer for the purpose of smoothing and transfers the smoothed communication packets to the personal computers PC1 to PC3. Each of the personal computers PC1 to PC3 receives a transferred communication packet via the corresponding one of the routers RT3 to RT5 and utilizes the communication packet on a preinstalled application.

A-2. General Structure of Routers RT1 and RT2

Figure 2:
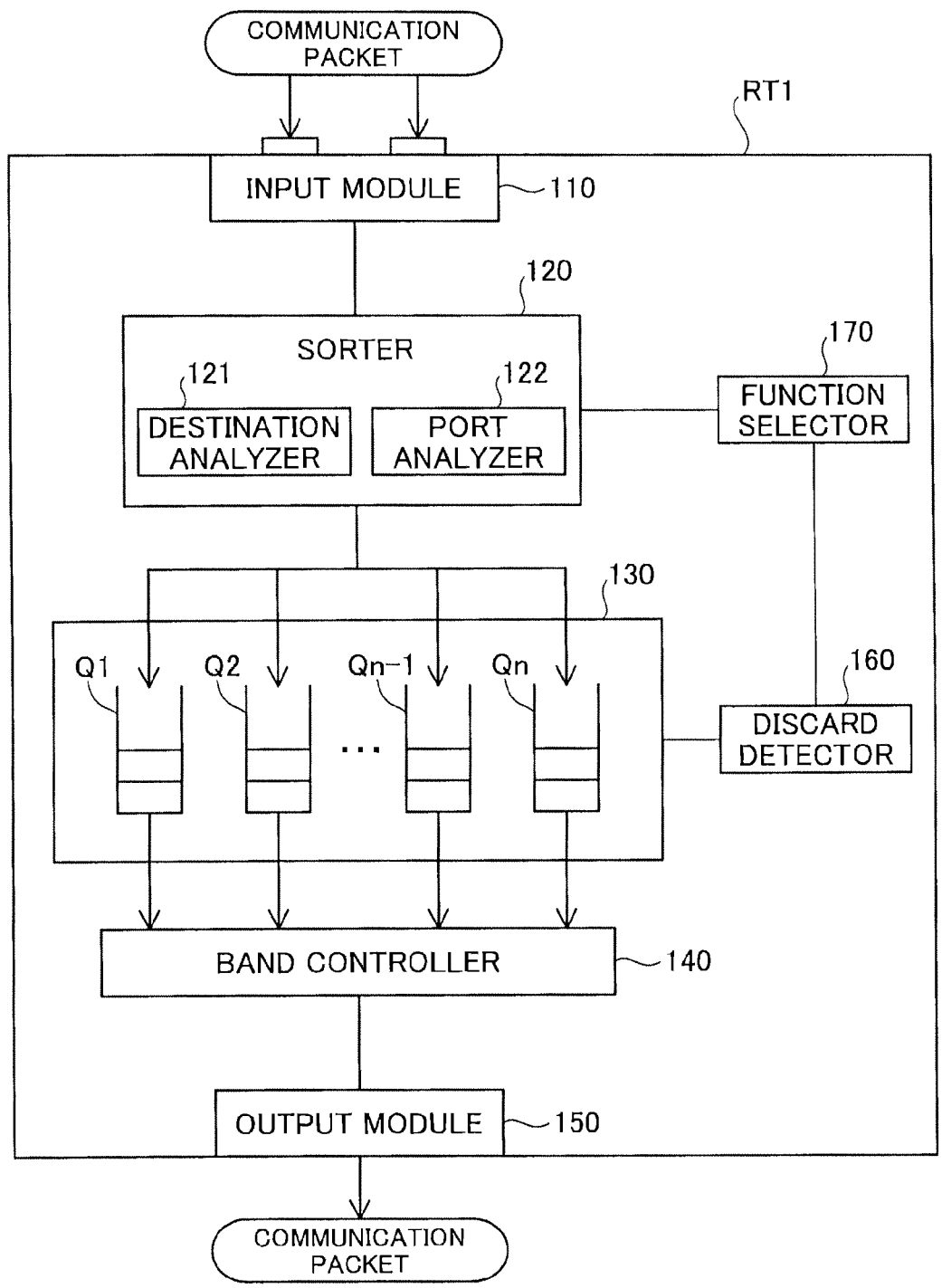
FIG. 2 is a functional block diagram showing the general structure of the router RT1.

The general structure of the routers RT1 and RT2 and smoothing control of communication packets are described below. Since the routers RT1 and RT2 have an identical structure according to this embodiment, only the structure of the router RT1 is described below, unless otherwise specified. The general structure of the router RT1 is shown in FIG. 2. The router RT1 includes an input module 110, a sorter 120, a buffer 130, a band controller 140, an output module 150, a discard detector 160 and a function selector 170.

The input module 110 is an interface that receives communication packets from outside. According to this embodiment, the input module 110 has two physical ports, which are respectively connected with the servers SV1 and SV2. The input module 110 receives communication packets from the servers SV1 and SV2 and accepts them as inputs from the servers SV1 and SV2. Alternatively the input module 110 may have three or more physical ports and may correspondingly be connected with three or more servers. According to this embodiment, the input module 110 adds port information as header information to each received communication packet.

The sorter 120 is constructed as a circuit that sorts each of the received communication packets received by the input module 110 to one of a plurality of queues Q1 to Qn (wherein n is an arbitrary integer of not less than 2) set in the buffer 130 (described later). The sorting depends on a specific value calculated by a predetermined function from transfer information regarding transfer of each received communication packet as an input value. According to this embodiment, a hash function is used as the predetermined function. The sorter 120 accordingly sorts each received communication packet to one of the queues Q1 to Qn according to the hash value calculated from the transfer information.

The hash function used in this embodiment outputs one of integers of 1 to n as the hash value. Each received communication packet is sorted to one of the queues Q1 to Qn having the same number as the output hash value. Using the identical number of available integers as the hash value with the number of queues ensures efficient sorting of communication packets. It is, however, not essential to make the number of available integers as the hash value identical with the number of queues. According to another embodiment, a correlation of the hash value to the queue may be determined in advance, and sorting of communication packets may depend on the correlation. According to still another embodiment, sorting of communication packets may depend on the remainder obtained by dividing the calculated hash value by a preset number. In summary, the predetermined function used for sorting communication packets may be any function that eventually gives an aggregate output from the input. In other words, the predetermined function may be any function that gives a narrower range of available values as the output than a range of available values as the input.

The sorter 120 includes a destination analyzer 121 and a port analyzer 122. The destination analyzer 121 is constructed as a circuit that obtains destination information as the transfer information. The destination information is included in header information of each communication packet and is specified by the destination of the communication packet. According to this embodiment, the destination analyzer 121 obtains a destination IP address as the destination information and sets the obtained destination IP address as the input of the hash function.

The port analyzer 122 is constructed as a circuit that obtains port information as the transfer information. The port information represents information for identifying a physical port that has received each communication packet, out of the two physical ports included in the input module 110. According to this embodiment, the port information is an identification number assigned to each of the physical ports of the input module 110. According to this embodiment, the port analyzer 122 refers to the header information of each communication packet and obtains the port information added as the header information by the input module 110. The method of obtaining the port information is, however, not limited to this procedure. According to another embodiment in which a CPU (not shown) of the router RT1 stores and manages the port information of each received communication packet in a memory of the router RT1, the port analyzer 122 may read the port information from the memory.

The sorter 120 is configured to selectively enable the sorting of communication packets by the destination analyzer 121 or the sorting of communication packets by the port analyzer 122. More specifically, the sorter 120 includes a switching circuit (not shown) to switch between the destination analyzer 121 and the port analyzer 122. According to this embodiment, the switching circuit receives a switching command from the CPU of the router RT1 and enables the connection with one of the destination analyzer 121 and the port analyzer 122, while disabling the connection with the other, in response to the switching command. The switching command may be accepted from the user on a setting screen provided by the router RT1, to which a terminal connected directly or indirectly to the router RT1 access via a WEB browser. The switching command may be received by means of GUI (Graphical User Interface) or a dip switch provided on the router RT1. As clearly understood from the above description, the sorter 120 may be configured to include only one of the destination analyzer 121 and the port analyzer 122.

According to this embodiment, in the router RT1 directly connected with the servers SV1 and SV2, the sorter 120 enables the port analyzer 122 for sorting communication packets. In the router RT2 relatively close to the personal computers PC1 to PC3, on the other hand, the sorter 120 enables the destination analyzer 121 for sorting communication packets. According to this embodiment, different hash functions are used for the sorting of communication packets by the destination analyzer 121 and for the sorting of communication packets by the port analyzer 122. The router RT1 takes into account the number of servers connected with the router RT1 and sets the number of queues to be set in the buffer 130. The router RT2 takes into account the number of home networks connected with the router RT2 and sets the number of queues to be set in the buffer 130. It is thus efficient to change the hash function corresponding to the number of queues. Alternatively, however, the same hash function may be used for the sorting of communication packets by the destination analyzer 121 and for the sorting of communication packets by the port analyzer 122.

The buffer 130 temporarily accumulates the communication packets received by the input module 110 and includes the plurality of queues Q1 to Qn. According to this embodiment, the plurality of queues Q1 to Qn have an identical storage capacity. The received communication packets are stored into the plurality of queues Q1 to Qn according to the sorting determined by the sorter 120 as described above. At the time of congestion, any communication packets exceeding the capacity of any of the queues Q1 to Qn are discarded. For example, when communication packets have been accumulated to the capacity of any of the queues Q1 to Qn, any communication packet newly input into the buffer 130 is not stored in any of the queues Q1 to Qn but is discarded.

The band controller 140 controls the bandwidth with regard to each of the queues Q1 to Qn and outputs the communication packets accumulated in the queues Q1 to Qn to the output module 150 for transmission of the packets. More specifically, the band controller 140 makes scheduling in conformity with a preset bandwidth control rule, successively reads out the communication packets from the queues Q1 to Qn and outputs the communication packets to the output module 150 for transmission of the packets. The output module 150 is an interface that sends the communication packets to outside. According to this embodiment, the scheduling is made by the fair queuing method. More specifically, the communication packets accumulated in the queues Q1 to Qn are read out from the queues Q1 to Qn at equal rates. The scheduling algorithm is, however, not limited to the fair queuing method but may be any other suitable method, e.g., weighted fair queuing method, minimum bandwidth guaranteeing method, maximum bandwidth limit method or weighted surplus bandwidth allocation method.

The discard detector 160 is constructed as a circuit that detects the amount of discarded communication packets with respect to each of the queues Q1 to Qn at the time of congestion. According to this embodiment, the amount of discarded data is counted for each of the queues Q1 to Qn. Alternatively the amount of discarded data may be detected as a difference value between the input to the queues Q1 to Qn and the output from the queues Q1 to Qn in a preset period of time. When the amount of discarded communication packets reaches or exceeds a preset level in any of the queues Q1 to Qn, the discard detector 160 outputs a preset signal to the function selector 170 (described later). The detected amount by the discard detector 160 is not limited to the amount of discarded data, but may be the degree of congestion based on the queue length for each of the queues Q1 to Qn.

The function selector 170 has a memory area for storing identification information of the hash function used by the sorter 120. The function selector 170 receives the preset signal from the discard detector 160, outputs identification information of a hash function with no usage history to the sorter 120 and causes the user 120 to use the hash function identified by the output identification information. The sorter 120 stores a plurality of hash functions that give different outputs from an identical input, and changes the hash function to be used, in response to a command from the function selector 170. The sorter 120 may be designed to incorporate the functions of the function selector 170.

A-3. Advantageous Effects

As described above, according to this embodiment, each of the routers RT1 and RT2 sorts and stores each received communication packet into one of the plurality of queues Q1 to Qn, depending on the specific value obtained by the predetermined function that gives an aggregate output from the input, which is transfer information regarding transfer of the received communication packet. Each of the routers RT1 and RT2 controls the bandwidth for each of the queues Q1 to Qn and outputs the communication packets accumulated in the plurality of queues Q1 to Qn to the output module 150. The received communication packets are thus distributed according to the transfer information and stored in the plurality of queues Q1 to Qn. This allows for isolation of the effect of discarding communication packets with respect to each of the queues Q1 to Qn at the time of congestion, thus preventing the congestion from affecting the entire traffic and ensuring the quality of service. This strategy does not need to provide a queue for each flow and thereby saves the capacity of the buffer 130 used for the queues. In other words, there is no limit in number of simultaneously supportable flows, so that the servers SV1 and SV2 can provide a large number of users with services of certain quality level. This leads to improvement of the versatility. No requirement for providing a queue for each flow decreases the labor required for setting the definition information, such as flow definition, and thereby reduces the load of the network provider.

Each of the routers RT1 and RT2 may sort each received communication packet to one of the plurality of queues Q1 to Qn, depending on the specified value obtained by the predetermined function using the destination information. The received communication packets are then distributed to the plurality of queues Q1 to Qn, based on the destination information. When congestion occurs due to the traffic in any of the personal computers PC1 to PC3, this ensures the quality of service for the traffics in unrelated ones of the personal computers PC1 to PC3 other than the personal computer causing the congestion. This advantage is especially significant for the router relatively far from the servers SV1 and SV2, i.e., the router relatively close to the personal computers PC1 to PC3 (router RT2 according to the illustrated embodiment). This strategy does not need to provide a queue for each flow and thereby saves the capacity of the buffer 130 used for the queues. This effect is especially advantageous when the number "n" of queues is less than the expected number of flows.

Each of the routers RT1 and RT2 may sort each received communication packet to one of the plurality of queues Q1 to Qn, depending on the specified value obtained by the predetermined function using the port information. The received communication packets are then distributed to the plurality of queues Q1 to Qn, based on the port information. When congestion occurs due to the traffic in any of the servers SV1 and SV2, this ensures the quality of service for the traffic in unrelated one of the servers SV1 and SV2 other than the server causing the congestion. This advantage is especially significant for the router relatively close to the servers SV1 and SV2, i.e., the router relatively far from the personal computers PC1 to PC3.

Especially the router RT1 directly connected with the servers SV1 and SV2 ensures the above effects. When the router RT1 is connected with servers via another router, any of the plurality of physical ports included in the router RT1 may be used unevenly, i.e., more frequently, for connection with the servers. Such indirect connection of the router with the servers has the less effect of distributing queues with respect to each server than the direct connection of the router with the servers. The direct connection of the router RT1 with the servers SV1 and SV2 can avoid such unevenness. This strategy utilizes the function for sorting communication packets and thereby does not need to provide a queue for each server. This saves the capacity of the buffer 130 used for the queues when the system includes a number of servers. This effect is especially advantageous when the number "n" of queues is less than the number of servers.

When the amount of discarded communication packets reaches or exceeds a preset level in any of the plurality of queues Q1 to Qn at the time of congestion, each of the routers RT1 and RT2 changes the predetermined function to be used for sorting communication packets. Using a fixed function cannot eliminate unevenness in distribution of communication packets to the queues, if there is any. The system of this embodiment, however, changes the predetermined function, which may eliminate such unevenness in distribution of communication packets to the queues. In summary, the system of this embodiment prevents the amount of discarded communication packets from reaching or exceeding a preset level and ensures the quality of service of certain level.

B. Second Embodiment

Figure 3:
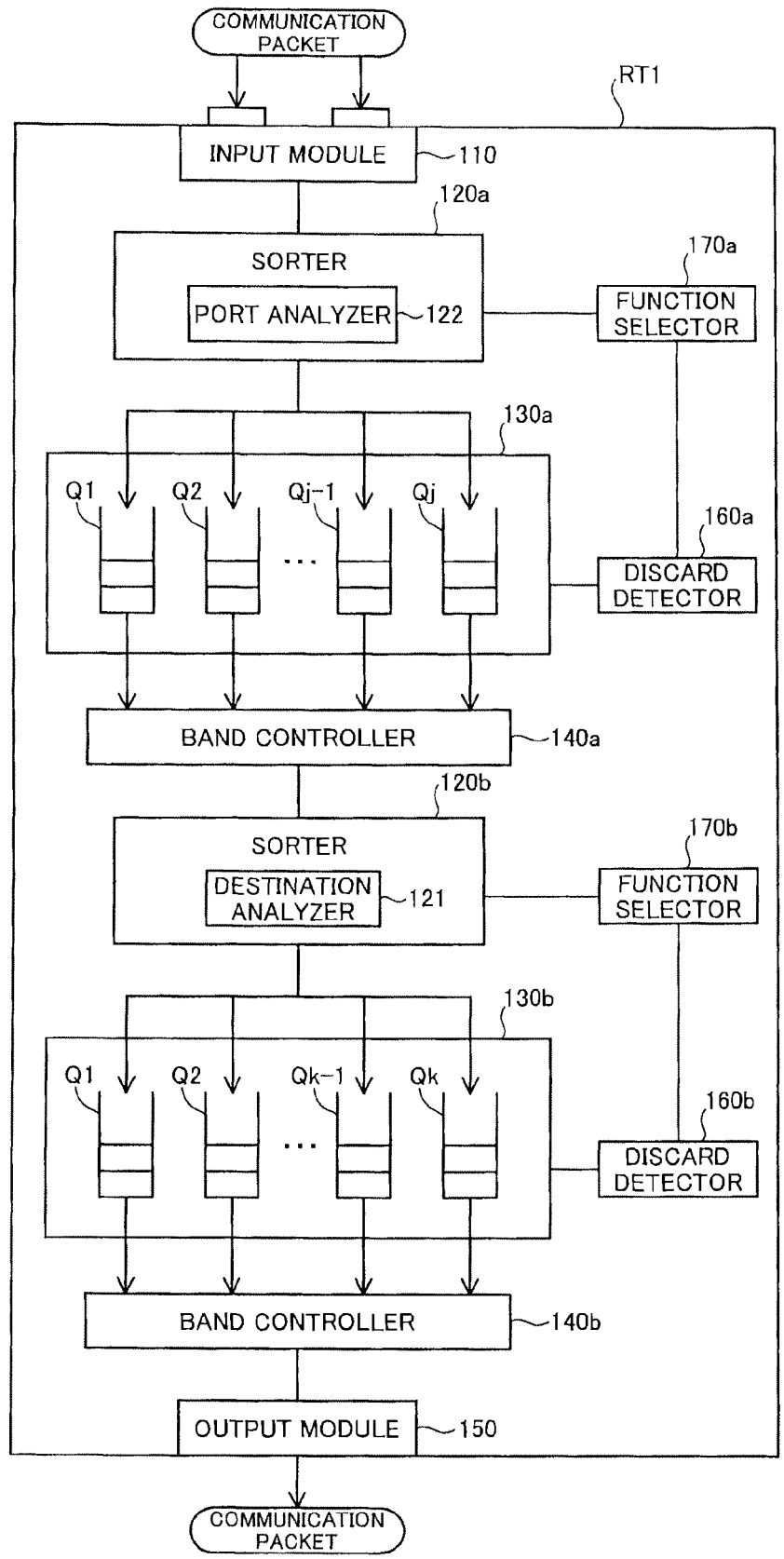
FIG. 3 is a functional block diagram showing the general structure of a router RT1 according to a second embodiment.

According to a second embodiment of the invention, a router RT1 sorts communication packets, based on both the destination information and the port information, unlike the first embodiment. Otherwise the system configuration of the second embodiment is identical with that of the first embodiment. The general structure of the router RT1 according to the second embodiment is shown in FIG. 3. The like components shown in FIG. 3 to those of the first embodiment shown in FIG. 2 are expressed by the like symbols and are not specifically described here. Two components of the second embodiment corresponding to one component of the first embodiment are expressed by the like symbol with suffixes "a" and "b" for the purpose of distinction and are only briefly described. As shown in FIG. 3, the router RT1 according to the second embodiment includes an input module 110, sorters 120a and 120b, buffers 130a and 130b, band controllers 140a and 140b, an output module 150, discard detectors 160a and 160b and function selectors 170a and 170b.

In the router RT1 according to the second embodiment, a communication packet received by the input module 110 first enters the sorter 120a. The sorter 120a includes a port analyzer 122 to sort each communication packet to one of queues Q1 to Qj (wherein j is an arbitrary integer of not less than 2) set in the buffer 130a, based on the port information. The band controller 140a successively reads communication packets from the queues Q1 to Qj in the buffer 130a in conformity with a preset bandwidth control rule and outputs the communication packets to the sorter 120b.

The sorter 120b includes a destination analyzer 121 to sort each communication packet to one of queues Q1 to Qk (wherein k is an arbitrary integer of not less than 2) set in the buffer 130b, based on the destination information. The band controller 140*b* successively reads communication packets from the queues Q1 to Qk in the buffer 130*b* in conformity with a preset bandwidth control rule and outputs the communication packets to the output module 150. The router RT1 sequentially performs the sorting of communication packets based on the destination information and the sorting of communication packets based on the port information in a stepwise manner.

When the amount of discarded communication packets reaches or exceeds a preset level in any of the queues Q1 to Qj in the buffer 130*a*, the discard detector 160*a* causes the function selector 170*a* to change the predetermined function to be used by the sorter 120*a*, in response to such detection. Similarly when the amount of discarded communication packets reaches or exceeds a preset level in any of the queues Q1 to Qk in the buffer 130*b*, the discard detector 160*b* causes the function selector 170*b* to change the predetermined function to be used by the sorter 120*b*, in response to such detection.

The router RT1 of this structure sorts each received communication packet to one of the plurality of queues, depending on the specific value obtained by the predetermined function using the destination information as the input and depending on the specific value obtained by the predetermined function using the port information as the input. The received communication packets can thus be distributed into the queues, based on both the destination information and the port information. When congestion occurs due to the traffic in any of the personal computers PC1 to PC3 and/or the servers SV1 and SV2, this prevents the congestion from affecting the entire traffic. The sorting of communication packets based on the destination information and the sorting of communication packets based on the port information may be performed in the reversed order.

The hierarchical configuration of the queues Q1 to Qj and the queues Q1 to Qk allows for the sorting of communication packets based on the destination information and the sorting of communication packets based on the port information in a stepwise manner. This simplifies the respective sorting processes. The hierarchical configuration of the queues is, however, not essential. According to another embodiment, each communication packet may be sorted according to the combination of the hash value calculated from the destination information and the hash value calculated from the port information.

C. Third Embodiment

C-1. Device Structure

According to a third embodiment of the invention, a router RT1 transfers a communication packet, which is sorted to a queue detected as congestion, to an importance analyzer 190 and changes the discard priority corresponding to the degree of importance of the communication packet. This is the primary difference from the system of the first embodiment, as described in detail below.

Figure 4:
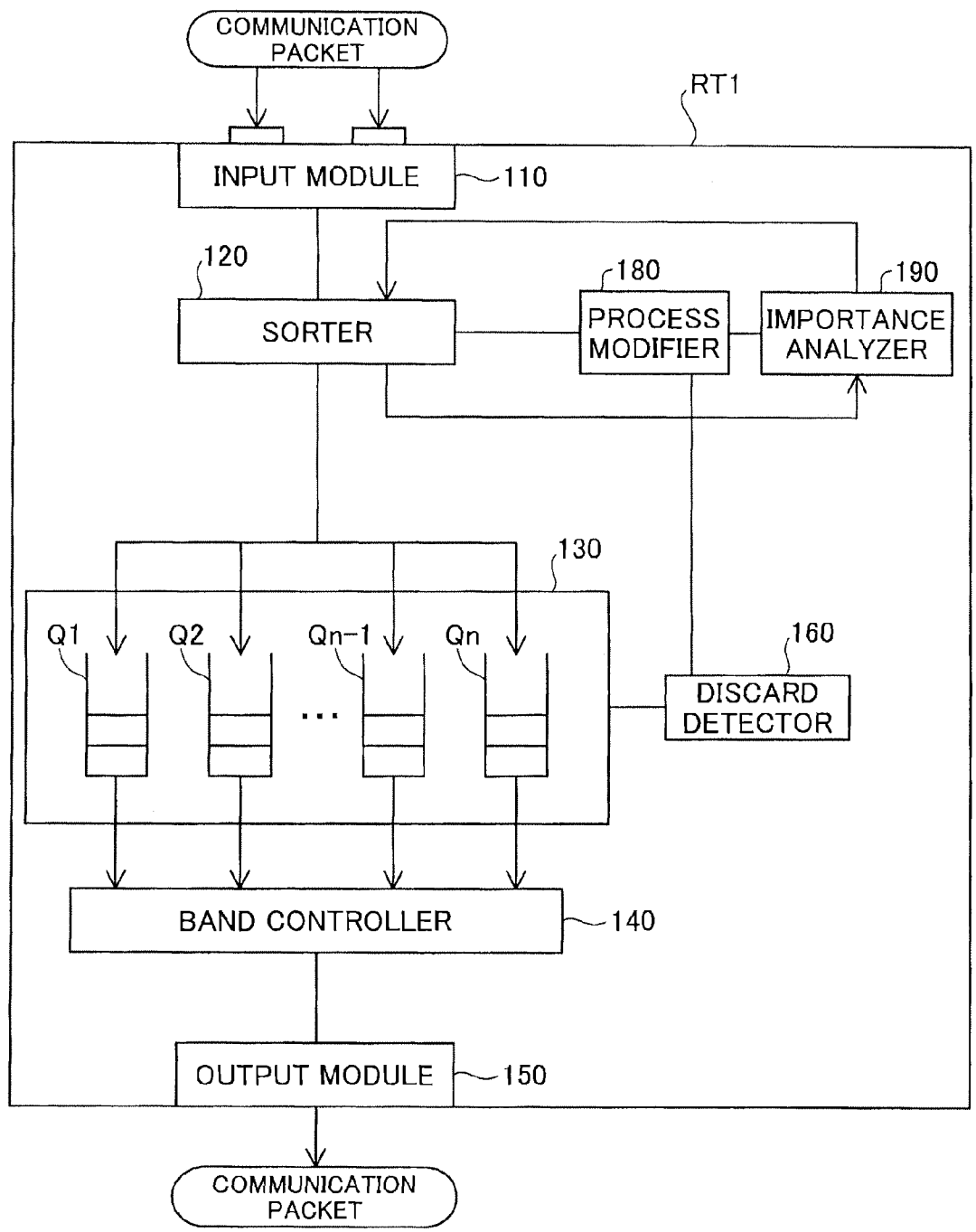
FIG. 4 is a functional block diagram showing the general structure of a router RT1 according to a third embodiment.

The general structure of the router RT1 according to the third embodiment is shown in FIG. 4. With reference to FIG. 4, the router RT1 of the third embodiment includes an input module 110, a sorter 120, a buffer 130, a band controller 140, an output module 150, a discard detector 160, a process modifier 180 and an importance analyzer 190. The primary differences from the first embodiment are addition of the process modifier 180 and the importance analyzer 190, as well as series of operations of the sorter 120 and the buffer 130 as described below in detail.

In the router according to the third embodiment, each communication packet received by the input module 110 enters the sorter 120. The sorter 120 enables either the destination analyzer 121 or the port analyzer 122 to sort the communication packet to one of a plurality of queues Q1 to Qn (wherein n is an arbitrary integer of not less than 2), based on either the destination information or the port information. The sorter 120 adds a control header representing the discard priority to the communication packet, before sorting one of the queues Q1 to Qn. The sorter 120 tentatively gives the lowest discard priority to a communication packet input from the input module 110. The communication packet with the lower discard priority has the lower probability of being discarded in the buffer 130 at the time of congestion, while the communication packet with the higher discard priority has the higher probability of being discarded in the buffer 130 at the time of congestion as described later in detail. The discard priority may be set in any number of multiple stages.

The respective queues Q1 to Qn of the buffer 130 according to this embodiment have discard control function. Each queue has a plurality of threshold values. The discard control compares the queue length of a queue with a corresponding threshold value, which is selected out of the plurality of threshold values in the queue corresponding to the discard priority of a communication packet to be newly added to the queue, and, when the queue length exceeds the corresponding threshold value, immediately discards the communication packet without being added to the queue. The router RT1 of the first embodiment uniformly discards a received communication packet to be newly added to a queue, when the queue length of the queue exceeds the capacity of the queue (i.e., threshold value of 100% relative to the capacity of the queue). The router RT1 of the third embodiment, on the other hand, discards a communication packet with the low discard priority when the queue length exceeds the capacity of the queue (i.e., threshold value of 100% relative to the capacity of the queue), while discarding a communication packet with the high discard priority when the queue length exceeds a preset threshold value relative to the capacity of the queue (for example, threshold value of 50% relative to the capacity of the queue). The buffer 130 of this embodiment performs the discard control of setting the lower discard probability for a communication packet with the lower discard priority and setting the higher discard probability for a communication packet with the higher discard priority. Any number of multiple threshold values may be set according to the discard priority. The buffer 130 refers to the control header of each communication packet to obtain the discard priority. When it is determined that the communication packet is to be added to a queue, based on the discard priority, the buffer 130 deletes the control header and then stores the communication packet into the queue.

Like the first embodiment, the band controller 140 successively reads communication packets from the queues Q1 to Qn in the buffer 130 in conformity with a preset bandwidth control rule and outputs the communication packets to the sorter 120.

Like the first embodiment, the discard detector 160 detects the amount of discarded communication packets or the degree of congestion with regard to each of the queues Q1 to Qn at the time of congestion in any of the queues Q1 to Qn. When either the amount of discarded communication packets or the degree of congestion reaches or exceeds a preset level in any of the queues Q1 to Qn, the discard controller outputs a preset signal to the process modifier 180. The preset signal includes information for identifying the queue with either the amount of discarded communication packets or the degree of congestion reaching or exceeding the preset level, i.e., the queue detected as congestion.

According to this embodiment, the process modifier 180 receives the preset signal from the discard detector 160 and gives an instruction to the sorter 120 to output a communication packet, which is to be sorted to a queue detected as congestion, not to the buffer 130 but to the importance analyzer 190. In response to the instruction given by the process modifier 180, the sorter 120 outputs the communication packet with the control header, which is to be sorted to the queue detected as congestion, to the importance analyzer 190. The sorter 120 may output only the header information (including the control header) of the communication packet to the importance analyzer 190, instead of outputting the whole communication packet with the control header to the importance analyzer 190. According to another embodiment, the sorter 120 may be designed to incorporate the functions of the process modifier 180. According to still another embodiment, the process modifier 180 may additionally have the functions similar to those of the function selector 170 of the first embodiment.

The importance analyzer 190 analyzes the degree of importance of a communication packet input from the sorter 120, based on preset header information included in the communication packet. The degree of importance may be analyzed, based on any header information field of layer 2 to layer 7, for example, the distinctions among I, P and B pictures and between their high frequency components and low frequency components in MPEG disclosed in Japanese Patent No. 3766259, the inner-device transfer priority, the DiffServ code point of the IP packet, the protocol information, or the port number. The importance analyzer 190 determines the discard priority of the communication packet according to the analyzed degree of importance and rewrites the discard priority stored in the control header of the communication packet. The importance analyzer 190 outputs the communication packet with the rewritten discard priority to the sorter 120. The sorter 120 sorts the communication packet input from the importance analyzer 190 to the originally planned queue in the buffer 130. The degree of importance may also be set in any number of multiple stages, like the discard priority.

As described above, the system of this embodiment changes the discard priority according to the degree of importance of a communication packet, which is to be sorted to a queue detected as congestion. The communication packet with the higher degree of importance is set to have the lower discard priority, while the communication packet with the lower degree of importance is set to have the higher discard priority. This sets the lower discard probability in the buffer 130 for the communication packet with the higher degree of importance. The importance analyzer 190 processes only the communication packets that are to be sorted to the queues detected as congestion. The importance analyzer 190 is thus not required to have the throughput for processing all communication packets. This saves the device cost.

C-2. Advantageous Effects

The conventional router without the importance analyzer 190 discards a communication packet at the time of congestion, independently of the degree of importance of the communication packet. For example, in the case of reproducing a video image from the flow sent to the terminals PC1 to PC3, the low frequency components representing the basic contour of the video image may be discarded with some probability. This results in significantly lowering the viewer's QoE (Quality of Experience).

The router RT1 of the third embodiment includes the importance analyzer 190 to change the discard priority according to the degree of importance of a communication packet, which is to be sorted to a queue detected as congestion. The communication packet with the higher degree of importance is set to have the lower discard priority, while the communication packet with the lower degree of importance is set to have the higher discard priority. This sets the lower discard probability in the buffer 130 for the communication packet with the higher degree of importance. For example, packets of the high frequency components of MEPG with the higher discard priority are preferentially discarded, so that packets of the low frequency components or basic contour parts of MPEG with the lower discard priority are hard to be discarded. This results in preventing a significant decrease of the viewer's QoE. The communication packets processed by the importance analyzer 190 are limited to the communication packets that are to be sorted to the queues detected as congestion. The importance analyzer 190 is thus not required to have the throughput for processing all communication packets. This saves the device cost.

D. Fourth Embodiment

D-1. Device Structure

According to a fourth embodiment of the invention, a router RT1 determines the transfer priority from the header information of a communication packet and limits the range of queues for sorting the communication packet according to the transfer priority. This is the primary difference from the system of the first embodiment, as described in detail below.

Figure 5:
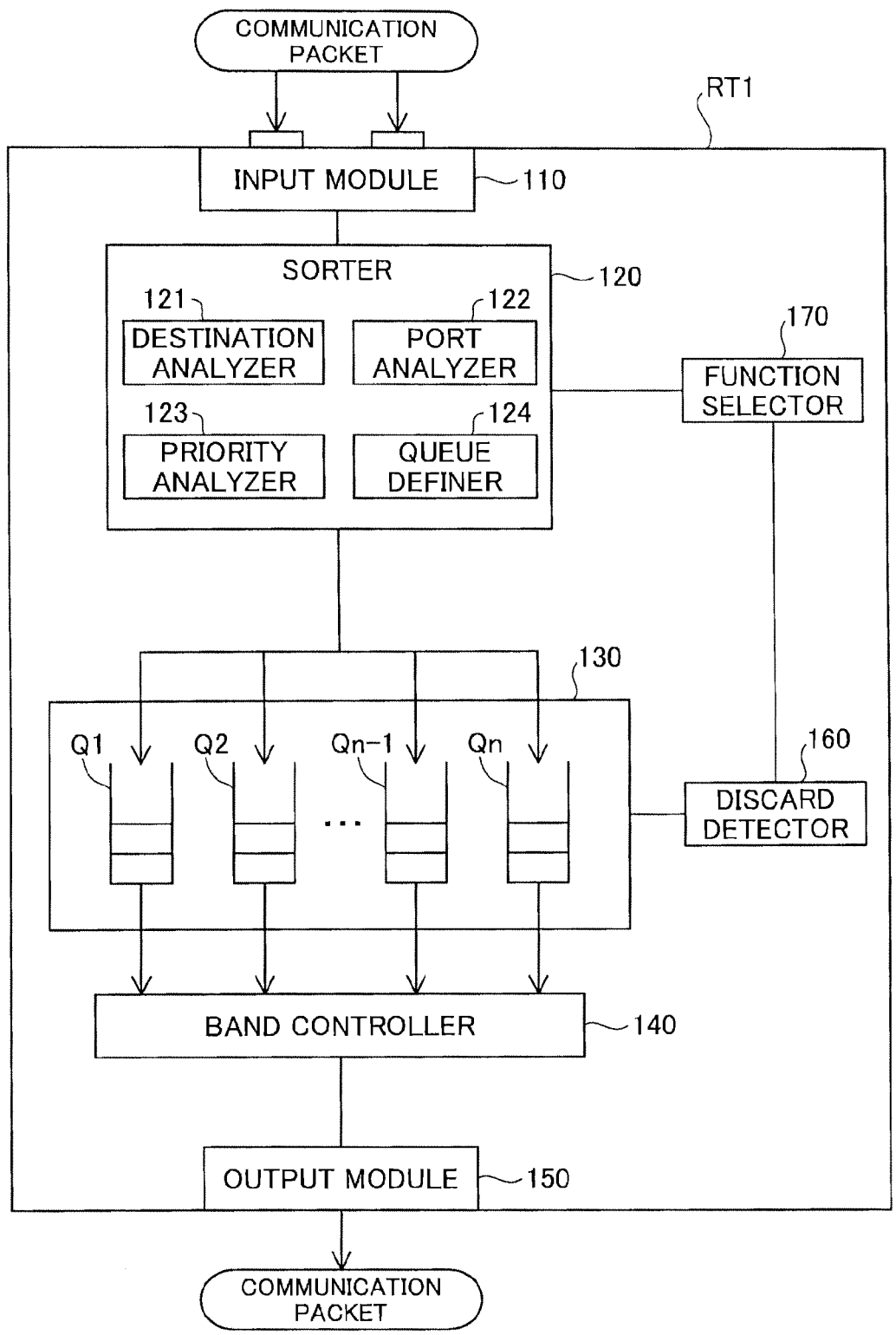
FIG. 5 is a functional block diagram showing the general structure of a router RT1 according to a fourth embodiment.

The general structure of the router RT1 according to the fourth embodiment is shown in FIG. 5. The like components shown in FIG. 5 to those of the first embodiment shown in FIG. 2 are expressed by the like symbols and are not specifically described here. As shown in FIG. 5, the router RT1 according to the fourth embodiment includes an input module 110, a sorter 120, a destination analyzer 121, a port analyzer 122, a priority analyzer 123, a queue definer 124, a buffer 130, a band controller 140, an output module 150, a discard detector 160 and a function selector 170.

The priority analyzer 123 determines the transfer priority from part of the header information of a communication packet. More specifically, the priority analyzer 123 identifies a parameter, for example, a protocol number included in IP header information or a destination port number or a source port number included in a TCP header or a UDP header. When the identified parameter is equal to a preset single value or is included in a preset value range, the priority analyzer 123 gives a specific transfer priority to the communication packet. Alternatively the priority analyzer 123 may give a specific transfer priority to the communication packet when the identified parameter is not equal to the preset single value or is not included in the preset value range. The parameter included in the header information and identified as the criterion for determining the transfer priority may be a single parameter or a combination of plural parameters. The transfer priority may be set in any number of multiple stages.

The queue definer 124 defines the range of queue numbers corresponding to the transfer priority of the communication packet determined by the priority analyzer 123. According to the first embodiment, the sorting destination is the entire range of the queues Q1 to Qn provided in the router RT1.

According to the fourth embodiment, however, the sorting destination is a limited range of queues set for each transfer priority. The limited range of queues may include only one queue or may include a plurality of queues. Discrete limited ranges of queues may be set for different transfer priorities. Alternatively, at least partly overlapping limited ranges of queues may be set for different transfer priorities. When the limited range of queues includes a plurality of queues, a communication packet is sorted to one of the plurality of queues, based on the hash value calculated by either the destination analyzer 121 or the port analyzer 122 as described in the first embodiment. When the limited range of queues includes only one queue, on the other hand, a communication packet is sorted to this only one queue without calculating the hash value as described in the first embodiment.

A concrete example of setting the transfer priority may set the highest priority to control packets used for, for example, routing protocol, neighbor discovery protocol (NDP), address resolution protocol (ARP) or network redundancy control, the higher priority to communication packets requiring the real-time processing, such as video stream or Voice over Internet Protocol (VoIP), and the lower priority to communication packets of the other flows, such as protocols used for communications of Web, E-Mail, FTP and P2P. The priority analyzer 123 refers to the header information of a received communication packet and determines the transfer priority of the communication packet.

The queue definer 124 may have the definition on the limited range of queue numbers to sort a communication packet with the highest priority to the queue Q1, a communication packet with the higher priority to one of the queues Q2 to Qk (wherein k is an integer of not less than 2 and less than n) and a communication packet with the lower priority to one of the queues Qk+1 to Qn. The destination analyzer 121 or the port analyzer 122 then works to sort a communication packet with the highest priority to the queue Q1, a communication packet with the higher priority to one of the queues Q2 to Qk and a communication packet with the lower priority to one of the queues Qk+1 to Qn. The operations of the destination analyzer 121 or the port analyzer 122 after definition of the limited range of queue numbers, to which the communication packet is to be sorted, are identical with those described in the first embodiment.

The band controller 140 preferentially reads communication packets from the queue Q1, in which the communication packets with the highest transfer priority are stored, subsequently reads communication packets from the queues Q2 to Qk, in which the communication packets with the higher transfer priority are stored, and then reads communication packets from the queues Qk+1 to Qn, in which the communication packets with the lower transfer priority are stored.

D-2. Advantageous Effects

In the router RT1 according to the fourth embodiment, the priority analyzer 123 determines the transfer priority of a communication packet. The queue definer 124 defines the limited range of queues, to which the communication packet is to be sorted, according to the transfer priority of the communication packet. The band controller 140 then performs bandwidth control to preferentially read the communication packets from the queues storing the communication packets with the higher transfer priorities. This protects the communication packets of the higher priorities, while saving the capacity of the buffer 130 by setting the limited range of queues for each transfer priority.

E. Modifications

Some modifications of the embodiments are described below.

E-1. Modification 1

In the embodiment described above, each of the routers RT1 and RT2 uses the destination IP address as the destination information for sorting a communication packet. The destination information is, however, not limited to the destination IP address but may be any information specified by the destination of the communication packet. For example, a frame transferred by the router RT1 or RT2 is an Ethernet (registered trademark) frame, the destination information may be a destination MAC address. In another example, a destination port number included in the TCP header may be used as the destination information. The server SV1 or SV2 generally sets a destination port number individually for each destination of a communication packet, so that such destination information is effectively usable for sorting a communication packet according to the destination of the communication packet. When the router RT1 or RT2 supports VLAN (Virtual LAN), a VLAN number may be used as the destination information. The VLAN number may be obtained by referring to a VLAN tag attached to the header.

E-2. Modification 2

In the system of the embodiment described above, the router RT1 directly connected with the servers SV1 and SV2 and the router RT2 located closest to home networks perform the bandwidth control based on the destination information or the port information. This structure may be adopted for another router located between the router RT1 and the router RT2. This ensures the advantageous effects described above to some extent.

E-3. Modification 3

According to the above embodiment, the router sorts a communication packet to one of a plurality of queues, based on the specific value obtained by the predetermined function using the port information as the input. According to another embodiment, the queue as the sorting destination of a communication packet may be determined directly corresponding to the physical port that has received the communication packet. When the router RT1 has a small number of physical ports, this simple structure can effectively prevent congestion due to traffic in the source of a communication packet from affecting the entire traffic. In this case, the number of physical ports may not be equal to the number of queues. For example, one queue may be allocated to every two physical ports.

E-4. Modification 4

Among the components of the routers RT1 and RT2 described above, part or all of the components implemented by the hardware configuration may be implemented by the software configuration, whilst part or all of the components implemented by the software configuration may be implemented by the hardware configuration.

The foregoing has described the invention in detail with reference to the illustrative embodiments and modifications.

Among the various elements of the above embodiments and modifications, the elements other than those disclosed in the independent claims are additional and supplementary elements and may be omitted or may be combined according to the requirements. The invention is not limited to the above embodiments or modifications, but a multiplicity of other variants and modifications may be made to the embodiments without departing from the scope of the invention. The invention is not limited to the relay device but may be actualized as, for example, a communication system including a plurality of relay devices, a relay method, a relay program, and a storage medium in which the relay program is recorded.

What is claimed is:

1. A relay device of relaying a communication packet, comprising:
   an input module configured to receive the communication packet as an input;
   a buffer configured to have a plurality of queues and temporarily accumulated the received communication packet;
   a sorter configured to sort the received communication packet to one of the plurality of queues, depending on a specific value obtained by a predetermined function that gives an aggregate output from an input which is transfer information regarding transfer of the communication packet; and
   a band controller configured to control a bandwidth for each of the plurality of queues and output communication packets accumulated in the plurality of queues for transmission of the communication packets, wherein
   the input module has a plurality of physical input ports, and
   the sorter is further configured to sort the communication packet according to both a first value obtained by a first function as the predetermined function using destination information that is included in header information of the received communication packet and is determined according to a destination of the communication packet, as the transfer information, and a second value obtained by a second function as the predetermined function using port information that identifies an physical input port that has received the communication packet among the plurality of physical input ports, as the transfer information.

2. The relay device according to claim 1, wherein
   the transfer information comprises destination information that is included in header information of the received communication packet and is specified by a destination of the communication packet.

3. The relay device according to claim 1, wherein
   the input module has a plurality of physical input ports, and
   the transfer information comprises port information capable of identifying a physical input port that has received the communication packet, among the plurality of physical input ports.

4. The relay device according to claim 1, wherein
   the plurality of queues are classified in multiple hierarchies, and
   the sorter performs a first process of sorting the communication packet to one of plural queues in one hierarchy of the multiple hierarchies according to the first value and a second process of sorting the communication packet to one of plural queues in another hierarchy of the multiple hierarchies according to the second value, in a stepwise manner.

5. The relay device according to claim 1, further comprising:
   a detector configured to detect a change of status of queues; and
   a function selector configured to change the predetermined function to another function provided in advance, when a predetermined change of at least one of queues is detected.

6. A relay device of relaying a communication packet, comprising:
   an input module configured to have a plurality of physical input ports and receive the communication packet as an input;
   a buffer configured to have a plurality of queues and temporarily accumulated the received communication packet;
   a sorter configured to sort the received communication packet to one of the plurality of queues, depending on a specific value obtained by a predetermined function that gives an aggregate output from an input which is transfer information regarding transfer of the communication packet; and
   a band controller configured to control a bandwidth for each of the plurality of queues and output communication packets accumulated in the plurality of queues for transmission of the communication packets, wherein
   the sorter is further configured to sort the communication packet according to both a first value obtained by a first function as the predetermined function using destination information that is included in header information of the received communication packet and is determined according to a destination of the communication packet, as the transfer information, and a second value obtained by a second function as the predetermined function using port information that identifies an physical input port that has received the communication packet among the plurality of physical input ports, as the transfer information.

7. A relay method of relaying a communication packet in a relay device having a plurality of queues, comprising:
   receiving a communication packet;
   sorting the received communication packet to one of the plurality of queues according to a specific value obtained by a predetermined function that gives an aggregate output from an input, which is transfer information regarding transfer of the communication packet, and storing received communication packets to the plurality of queues in a distributive manner;
   controlling a bandwidth for each of the plurality of queues and sending communication packets accumulated in the plurality of queues, and
   sorting the communication packet according to both a first value obtained by a first function as the predetermined function using destination information that is included in header information of the received communication packet and is determined according to a destination of the communication packet, as the transfer information, and a second value obtained by a second function as the predetermined function using port information that identifies an physical input port that has received the communication packet among a plurality of physical input ports of an input module, as the transfer information.

8. The relay device according to claim 1, further comprising:
   a congestion detector configured to detect a degree of congestion with regard to each of the plurality of queues; and an importance analyzer configured to analyze a degree of importance based on header information of the communication packet, wherein when it is determined that any of the degree of congestions detected with respect to the plurality of queues is not less than a preset level, the sorter transfers to the importance analyzer a communication packet, which is to be sorted to a queue determined to have the degree of congestion that is not less than the preset level, the importance analyzer analyzes the degree of importance of the communication packet transferred from the sorter, determines discard priority of the communication packet based on the analyzed degree of importance, adds the determined discard priority to the communication packet and transfers the communication packet with the discard priority to the sorter, the sorter sorts the communication packet with the discard priority to one of the plurality of queues, and the buffer refers to the discard priority added to the communication packet sorted by the sorter and determines whether the communication packet is to be stored in the queue, based on the discard priority and a threshold value determined corresponding to the discard priority.

9. The relay device according to claim 5, wherein:

the detector includes a congestion detector configured to detect a degree of congestion with regard to each of the plurality of queues; and the function selector includes a second function selector configured to change the predetermined function to another function provided in advance, when any of the degrees of congestions detected with regard to the plurality of queues is not less than a preset level.

10. The relay device according to claim 1, further comprising:

a priority analyzer configured to determine a transfer priority of the communication packet received by the input module, based on a value included in header information of the received packet; and a queue definer configured to define a limited range of queues, to which a communication packet is to be sorted, with respect to each transfer priority.

11. The relay device according to claim 10, wherein the priority analyzer determines the transfer priority, based on the header information of the communication packet, and the sorter sorts the communication packet to the limited range of queues defined by the queue definer, based on the determined transfer priority.

12. The relay device according to claim 5, wherein:

the detector includes a discard detector configured to detect an amount of discarded communication packets with respect to each of the queues at congestion in any of the plurality of queues; and the function detector includes a first function selector configured to change the predetermined function to another function provided in advance, when any of the amounts of discarded communication packets detected with respect to each of the queues reaches or exceeds a preset level.

13. The relay device according to claim 6, further comprising:

a detector configured to detect either a degree of congestion with regard to each of the plurality of queues and an amount of discarded communication packets with respect to each of the queues at congestion in any of the plurality of queues; and a function selector configured to change the predetermined function to another function provided in advance according to the detected degree of congestion or the amount of discarded communication packets.

14. The relay method according to claim 7, further comprising:

detecting a predetermined change of status of at least one of the queues; and changing a predetermined function to one of other predetermined functions when a predetermined change of at least one of queues is detected.

* * * * *